Aug. 26, 1952        E. W. FAHEY        2,608,284
CONVEYER APPARATUS FOR HANDLING AND PACKAGING EGGS
Filed April 11, 1946        2 SHEETS—SHEET 1
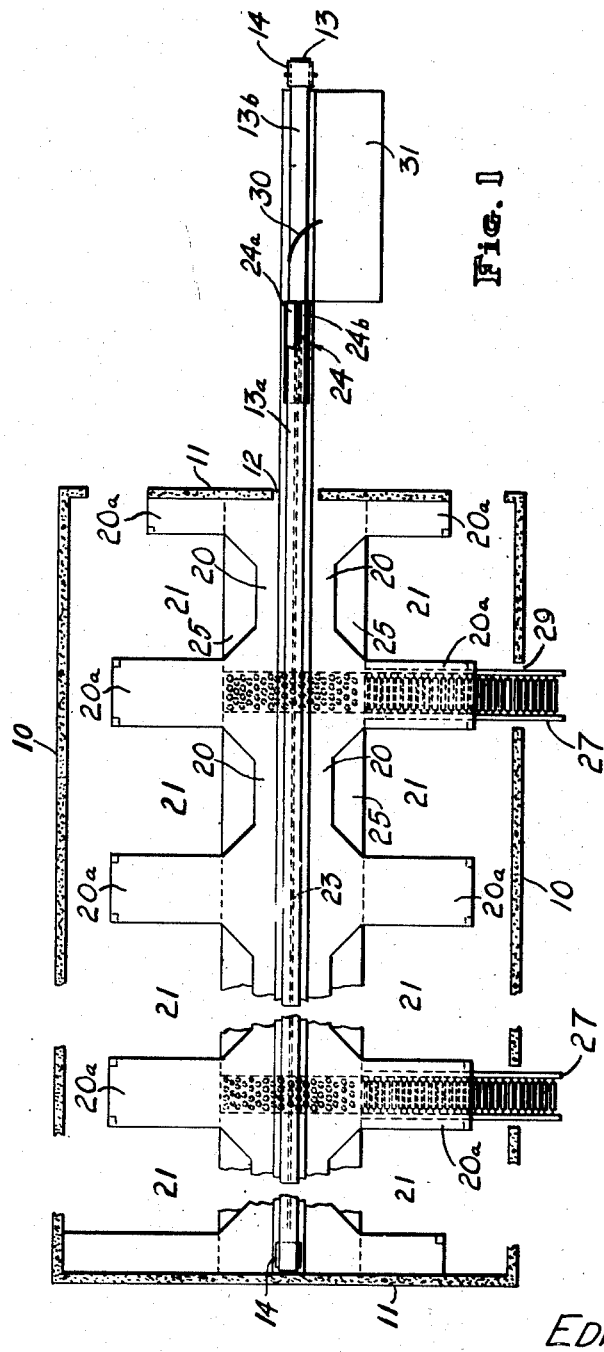
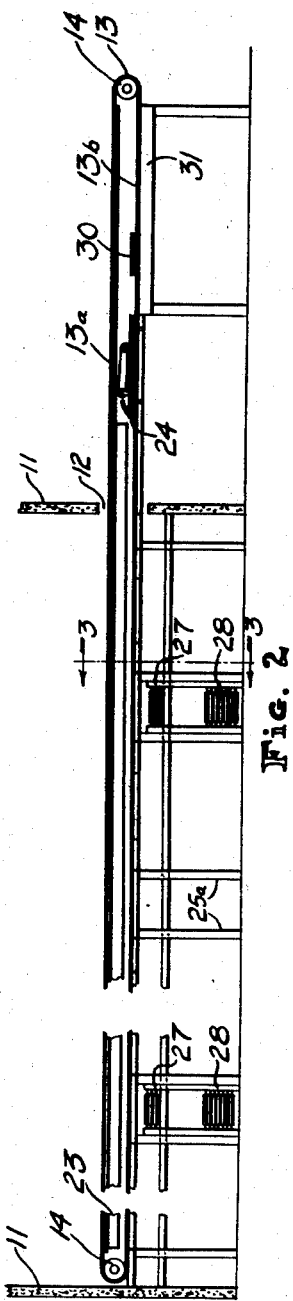
INVENTOR.
EDWARD W. FAHEY
BY
Cromwell, Greist and Warden
ATTORNEY

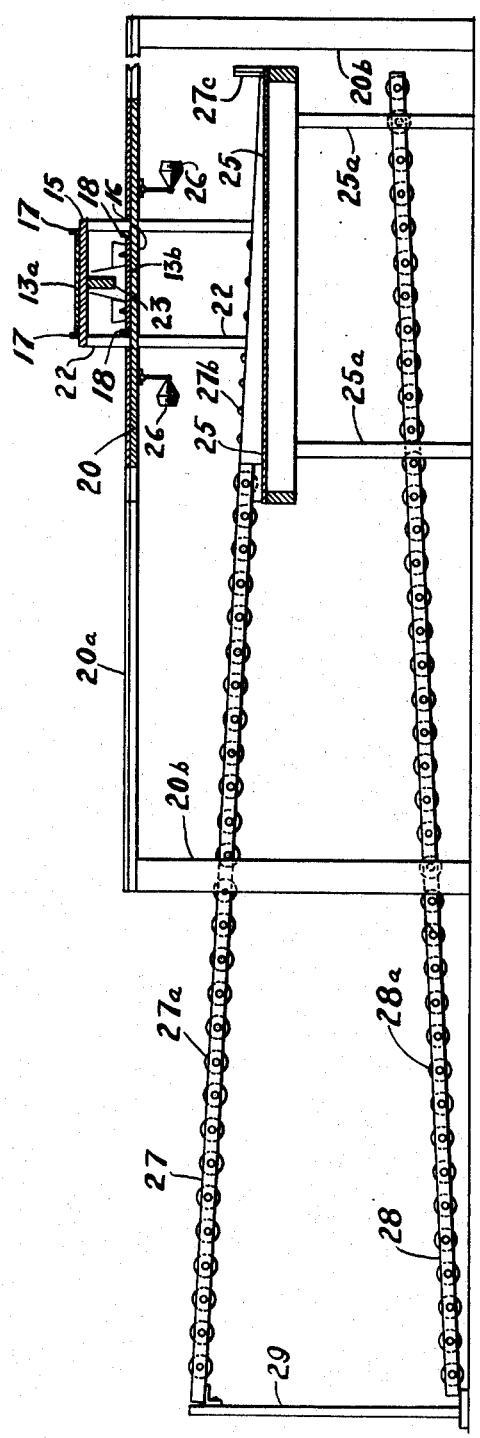

Patented Aug. 26, 1952

2,608,284

UNITED STATES PATENT OFFICE 2,608,284

CONVEYER APPARATUS FOR HANDLING AND PACKAGING EGGS

Edward W. Fahey, Chicago, Ill., assignor to Shellmar Products Corporation, Mount Vernon, Ohio, a corporation of Delaware Application April 11, 1946, Serial No. 661,455

4 Claims. (Cl. 198—19)

This is a continuation in part of my copending application, Serial No. 611,589, filed August 20, 1945.

This invention relates to egg handling mechanism or equipment, particularly that of the type adapted for use in the rooms where eggs are inspected and graded in large quantities. Such rooms, generally called in the trade, "egg rooms," usually consist of a darkened area in which a number of so-called "candlers" work, their work being primarily that of grading eggs of indiscriminate size, condition and quality, usually received by them in conventional thirty dozen capacity cases and packed in fillers and flats, into classes or grades of definite size and quality.

Consumer acceptance of cartoned eggs has made possible the packing of the majority of the eggs candled and graded into such cartons. In the past such cartons after being filled have usually been disposed of by being repacked into the same or similar cases in which the eggs were received by the grader in the egg grading or packing station. This condition has made necessary the use of a large amount of space per individual grader, and has the additional disadvantage of reducing the output of the grader or "candler."

Some of the greatest problems in an egg room are: Providing the graders with adequate supplies of set up cartons; providing them with an adequate supply of eggs for inspection; providing adequate means for disposal of empty egg cases and those containing eggs of a quality not of sufficiently high standard to be cartoned; and coincidentally providing means for disposal from the grading room of cartoned eggs.

Accordingly an object of this invention is to provide egg room apparatus of a very compact character adapted to reduce the amount of service required by each packer or candler.

More specifically, an object is to provide an apparatus having simple means for efficiently furnishing each packer with a readily accessible supply of egg cartons, having means for the disposal of cartoned eggs, means readily accessible to the packer for receiving ungraded eggs in cases, and readily accessible means for disposing of cases which are empty, except for fillers and flats that contain eggs of a quality not suitable for cartoning.

Other and further objects of the invention will become apparent from the following detailed description and from the drawings in which Fig. 1 is a diagrammatic plan view, partially broken away, of a typical egg room and apparatus therein embodying the invention;

Fig. 2 is a side elevation, partially broken away, of the structure of Fig. 1; and Fig. 3 is a cross sectional view, on an enlarged scale, taken substantially on the line 3—3 of Fig. 2.

Referring to the drawings, there is shown diagrammatically in Figs. 1 and 2 a typical egg room comprising side walls 10 and end walls 11 defining a relatively darkened area in which the actual egg grading is accomplished.

A horizontally extending endless belt or conveyor 13 traverses the egg room medially and extends outwardly longitudinally through opening 12 in one end wall 11 thereof a substantial distance. As shown, pulleys 14 carry belt 13 at its ends, these pulleys being of sufficient diameter to space the upper reach 13a of endless belt 13 sufficiently above lower reach 13b thereof to accommodate the other elements, hereinafter described, which are associated with such lower reach. One pulley 14 is connected to a suitable drive means (not shown) to impart movement thereto and to belt 13.

As particularly shown in Fig. 3 both reaches 13a and 13b of belt 13 are supported along their under sides by supporting surfaces 15 and 16, respectively, such surfaces being of greater width than and approximating the length of each of said reaches. Both reaches 13a and 13b are guided in their travel by side guides 17 and 18, respectively, and lower reach 13b, is preferably generally coplanar with shelving 20 (Figs. 1 and 2) in the portion thereof adjacent the generally U-shaped areas 21. Said areas are the stations in which each egg packer works. Areas 21 are generally defined by horizontal shelving 20, parallel to conveyor 13, and by horizontal lateral extensions of shelving 20, denoted 20a, the latter being supported by upright legs 20b. It will be noted that areas 21 are spaced longitudinally of conveyor 13 in two rows and that such rows and each packing station in its opposite row are in transversely aligned face-to-face relation to one another.

The upper belt reach 13a is supported above belt reach 13b by the superstructure 22, substantially as shown. A longitudinally extending depending divider 23 extends downwardly from the lower face of upper reach supporting surface 15, substantially medially of the width of belt reach 13b, such divider being of a width to terminate in spaced relation to the surface of said belt reach 13b, as shown in Fig. 3. Divider 23 extends longitudinally of belt reach 13b throughout a major portion of the length of said belt reach, terminating, as shown in Figs. 1 and 2, adjacent a carton closing and sealing machine 24 of, for instance, the type shown in U. S. patent to Johnson No. 2,242,304. Hence the divider provides on belt reach 13b two substantially identical parallel paths of travel, the purposes of which are hereinafter set forth.

Below and extending laterally outwardly from shelving 20 and superstructure 22, and supporting the same in parallel relation to the path of travel of conveyor 13, are longitudinally extending benches or shelves 25, the latter, with shelving 20, defining the forepart of each candling station or area 21. Shelves 25 are supported at a desired height above the floor by legs 25a. Conventional egg candling lights 26 are positioned between shelves 20 and 25, substantially medially of areas 21.

Reference numerals 27 and 28 denote, respectively, inclined upper and lower reaches of an egg case conveyor, such reaches being positioned in the same vertical plane and extending outwardly, preferably at a right angle to the conveyor framework and on one side thereof, through an opening 29 in one egg room side wall 10.

As particularly shown in Figs. 2 and 3, conveyor reach 27 is inclined downwardly and inwardly in the direction of shelves 25, terminating adjacent the same, and conveyor reach 28 is inclined downwardly and outwardly. Both reaches are supported in vertically spaced relation by end support 29 and elements 20b and 25a, mentioned above. Conveyor reach 28 comprises throughout its length the spaced parallel rollers 28a, while conveyor reach 27 is shown as being comprised only in part of spaced parallel rollers 27a, the aligned row thereof shown in Fig. 3, terminating adjacent but short of the juncture of conveyor 27 with one shelf 25. The anti-friction surface contemplated for the conveyor is completed by inverted ball races 27b. A stop 27c is provided at the end of the incline of conveyor 27.

It will be noted that conveyor reaches 27 and 28 traverse the path of travel of reaches 13a and 13b of conveyor 13 between pairs of laterally adjacent, and at one side of, each pair of diametrically opposed candling stations or areas 21. They also extend across the conveyor framework, thus providing conveyor means common to four of such stations or areas.

The carton closing machine 24, like flight 13b of belt 13, is medially divided to provide two parallel paths of travel 24a and 24b for egg cartons handled thereby, as hereinafter more fully described. An arcuate sweep or diverter 30 is positioned beyond carton closing machine 24 in the direction of travel of belt reach 13b, which diverter 30 extends across the width of belt reach 13b sufficiently thereabove to permit said reach to pass thereunder. Sweep 30 functions to divert cartons out of the path of travel of said belt reach and onto table top 31.

In operation of the egg room, service persons place conventional cases filled with eggs packed in fillers and flats on conveyor reach 27 by which they are gravity conveyed between laterally adjacent and diametrically opposed candling stations 21. The packers in each of the four adjacent stations each remove a case for inspection and packing of its contents. The packer usually places this case on shelf 25 and removes from upper reach 13a of conveyor 13 a supply of set up egg cartons. Such erected cartons are placed on the conveyor manually or are automatically placed thereon by a carton set up machine, and the cartons are removed from the conveyor by the packer and conveniently arranged for use on shelves 25. It is also customary for the packer to arrange about her on shelves 20 a plurality of filler and flat assemblies, removed from egg cases, into which the several grades not acceptable for carton pack may be placed. These last mentioned eggs may be generally classified as "inedibles" such as spoiled eggs and those containing blood spots, etc.; eggs which are soiled, usually called "dirties;" and eggs showing shell damage, usually called "checks."

The packer proceeds then to candle and grade the eggs, placing the edible grades into cartons appropriate to each grade. When an egg carton is filled, the carton is placed on that side of conveyor reach 13b accessible to the packer, with the tops of the cartons open and arranged closely parallel to depending divider 23, as shown in Fig. 3. The eggs are thus conveyed to and through carton closing machine 24. In passing through carton closer 24 the tops of the cartons are folded down into covering relation to the carton bottoms and are locked in that position by conventional hooks integral with the carton, such hooks fitting under the hinges of the cell-defining transverse partitions. After passing through carton closing machine 24 the cartons are conveyed a short distance on conveyor reach 13b and then shunted off the same to the top of table 31, at which point the cartoned eggs are repacked into egg cases.

It is customary for the packer to temporarily retain in her work area several egg cases into which filler and flat assemblies arranged on shelves 20, that have been filled with off grade eggs, may be placed. It is the usual custom to pack each off grade separately, that is, "inedibles" in one case, "dirties" in another and "checks" in still another. Since, in general, the majority of eggs handled fall into one of the several grades which are cartoned, as hereinabove described, each packer regularly finds it necessary to dispose of an empty egg case. Such cases are placed on conveyor 28, which, being inclined as shown in Fig. 3, transports such cases exteriorly of the darkened egg room, whence they are taken by the service helpers to a position adjacent table 31 for use as containers for eggs in cartons.

When the packer has filled a case with a particular grade of "throw-outs" the cases containing the same are handled by the packer in the same manner as that set forth above with respect to empty egg cases, the off-grade eggs being disposed of by the service personnel.

It will be seen from the drawings and the above detailed description that this invention affords means for effectively achieving the objects set forth and it is realized that various modifications may suggest themselves to those skilled in the art, yet falling within the scope of my concept. I do not, therefore wish to be limited to the exact form or embodiment shown, the same being merely illustrative, except as limited by the scope of the following claims:

I claim:

1. Egg handling mechanism comprising an endless belt having vertically spaced article conveying reaches, said belt extending medially horizontally and longitudinally of two rows of aligned egg grading stations facing the same, means associated with at least one reach of said belt to define two paths of travel thereon, and at least two conveyor reaches extending angularly to and across said endless belt between two adjacent stations in each row for access to said last named reaches from either row.

2. Egg handling mechanism comprising a longitudinally extending conveyor, a plurality of candling stations positioned on each side of said conveyor in transverse alignment with each other, an egg case conveyor passing transversely of said longitudinal conveyor between pairs of adjacent candling stations on either side of said egg case conveyor, said egg case conveyor extending across and beneath the longitudinally extending conveyor to the candling stations on the opposite side thereof, and an empty egg case conveyor below said egg case conveyor and also extending transversely between said adjacent candling stations.

3. Egg handling equipment comprising sets of egg candling stations positioned opposite one another with the respective opposed stations in transverse alignment, means for supplying empty egg cartons to said stations, means for transporting filled egg cartons from said stations, said supply and transporting means extending longitudinally of and between the respective sets of opposed stations, means for maintaining filled egg cartons loaded from opposite sides of said transporting means in spaced relation during travel along said last named means, a delivery station for said cartons beyond said candling stations, a transversely extending filled egg case conveyor passing from one side of said supply and transporting means to egg candling stations on the other side thereof, said last named conveyor being positioned between adjacent stations and extending beneath the carton transporting means, and an empty egg case conveyor below said filled egg case conveyor.

4. An egg room installation comprising a longitudinally extending conveyor having a delivery reach and a return reach positioned thereabove, a plurality of candling stations located on opposite sides of the conveyor with the respective stations on said respective sides in transverse alignment and facing each other, transverse feed means for egg cases, said feed means extending transversely across said conveyor between two candling stations on the same side of said conveyor and below the delivery reach thereof, and a case conveyor positioned below said feed means.

EDWARD W. FAHEY.

REFERENCES CITED

The following references are of record in the file of this patent:

UNITED STATES PATENTS

| Number | Name | Date |
|---|---|---|
| 907,917 | Thomas | Dec. 29, 1908 |
| 1,558,014 | Jaenicke | Oct. 20, 1925 |
| 1,560,830 | Langsdorf | Nov. 10, 1925 |
| 1,710,969 | Dempsey | Apr. 30, 1929 |
| 2,138,285 | Spiegl | Nov. 29, 1938 |
| 2,264,461 | Steves | Dec. 2, 1941 |
| 2,328,299 | Schwab | Aug. 31, 1943 |